(12) United States Patent
Tranquilla

(10) Patent No.: US 6,205,873 B1
(45) Date of Patent: Mar. 27, 2001

(54) TRANSMIT MOTION VIA FLEXURES

(75) Inventor: Michael N. Tranquilla, Livonia, MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/313,158

(22) Filed: Aug. 31, 1998

Related U.S. Application Data

(60) Provisional application No. 60/058,584, filed on Sep. 12, 1997.

(51) Int. Cl.$^7$ .................................................. F16H 21/44
(52) U.S. Cl. ................................... 74/96; 74/63; 267/160
(58) Field of Search ........................... 74/96, 63; 267/160

(56) References Cited

U.S. PATENT DOCUMENTS

| | | | | |
|---|---|---|---|---|
| 3,279,278 | * | 10/1966 | Eldred ...................................... | 464/55 |
| 3,362,252 | * | 1/1968 | Ditlinger ................................. | 464/55 |
| 3,768,334 | * | 10/1973 | Ditlinger ................................. | 464/55 |
| 4,261,211 | * | 4/1981 | Haberland .............................. | 267/160 |
| 4,414,860 | * | 11/1983 | Brunsch ................................. | 74/579 E |
| 4,567,782 | * | 2/1986 | Speicher et al. ........................... | 74/96 |
| 4,715,589 | * | 12/1987 | Woerndle ............................... | 267/148 |
| 4,873,889 | * | 10/1989 | Ditlinger ................................. | 464/55 |
| 6,050,556 | * | 4/2000 | Masuda et al. ........................ | 267/160 |

\* cited by examiner

*Primary Examiner*—David Fenstermacher
(74) *Attorney, Agent, or Firm*—David G. Raumussen; Mark T. Starr; Rocco L. Adornato

(57) ABSTRACT

A linkage couples a pair of rotatable shafts so that the rotation of one the shafts causes rotation of the other said shaft about the some axis. The linkage includes a pair of thin flexure strips disposed in parallel between the pair of parallel rotatable shafts One end of the pair of flexure strips is coupled to one of the rotatable shafts and the other end of the pair of flexure strips is coupled to the other rotatable shaft. The pair of thin flexure strips is coupled to the shafts so that the rotation of one of the shafts will cause the flexure strips to rotate the other of the shafts. The rotatable shafts rotate around parallel axes. The flexure strips flex and bend together as the rotatable shafts rotate. The rotational motion transmitted by the flexure strips has the same axis as the rotation axis of the shafts.

17 Claims, 3 Drawing Sheets

TRANSMIT MOTION VIA FLEXURES

This is a continuation of my U.S. Provisional filing, U.S. Ser. No. 60/058,584, filed Sep. 12, 1997 and priority therefrom is hereby claimed.

This involves devices for transmitting minor rotational motion between parallel shafts; and especially via flexure-strip linkage.

BACKGROUND, FEATURES

Workers who make and use rotation-transmitting devices know that they are apt to exhibit excessive "play", be too noisy, and involve sliding surfaces that are too readily contaminated by ambient dust and other fine abrasives. It is an object hereof to address such problems, providing rotation-transmission (e.g. less than 90°), and especially in a device which transmits small rotary motion between parallel shafts with the use of offset flexures. Small motions here means rotations less than 90 degrees. A salient object is to transmit motion between parallel shafts with no backlash (i.e.; play) and no sliding motion surfaces that can be contaminated with dirt or other foreign objects.

This is preferably done via a paired-flexure array and the bending of flexures connecting rigid links fastened to each of two parallel shafts to allow rotary motion from one shaft to be transmitted to the other, without relative sliding between the flexure and shaft or other parts. This array can be operated at high rates of actuation because of the longitudinal sliding between the flexure and shaft or other parts. It can be operated at high rates of actuation because of the longitudinal stiffness of the flexures. Absence of backlash (i.e.; play) prevents lost motion and impacts which can cause acoustic noise.

Conventional means for transmitting motion between parallel shafts involve devices that have backlash (i.e.; play) which can be a source of acoustic noise, (e.g. from gears and linkages). Relative motion at the joints of these devices can also produce wear. The same is true of belt or cable couplings. Furthermore, these devices can easily be contaminated by foreign matter such as paper dust, sand, dirt, or other abrasive materials from environments in which these mechanisms may be required to operate. The use of seals to keep these contaminants out is cumbersome, and the seals themselves can be a source of wear. Adding seals to the coupling joints also adds mass, a detriment for high speed actuation. [e.g. see "Flexure devices—for economic action", *Machine Devices and Instrumentation*, NP Chironis, ed., McGraw-Hill, 1966, pp. 176–177, which shows motion devices using flexures but no paired-flexure couplings, as with this invention].

This invention gives a simple means of avoiding the above mentioned problems when small rotations are to be transmitted between parallel shafts. It can undergo an infinite number of actuations theoretically if the flexures are designed such that the stresses they experience are less than the endurance limit for their material. Steel, a common flexure material, may be used for example.

Thus, it is an object hereof to ameliorate (at least some of) such problems and to provide (at least some of) such advantageous features.

BRIEF DESCRIPTION OF THE DRAWINGS

These and other features and advantages of the present invention will be appreciated by workers as they become better understood by reference to the following detailed description of the present preferred embodiments; these should be considered in conjunction with the accompanying drawings, wherein:

FIG. 1 is an isometric view, greatly simplified, of a preferred "paired-flexure-linkage" embodiment; while

The invention will be better appreciated by workers upon consideration of the following detailed description of preferred embodiments.

DESCRIPTION OF PREFERRED EMBODIMENTS

The means discussed herein will generally be understood as selected, formulated, and operating as presently known in the art, except where otherwise specified. And, except as otherwise specified, all materials, methods, and devices and apparatus herein will be understood as implemented by known expedients according to present good practice.

Figure 1:
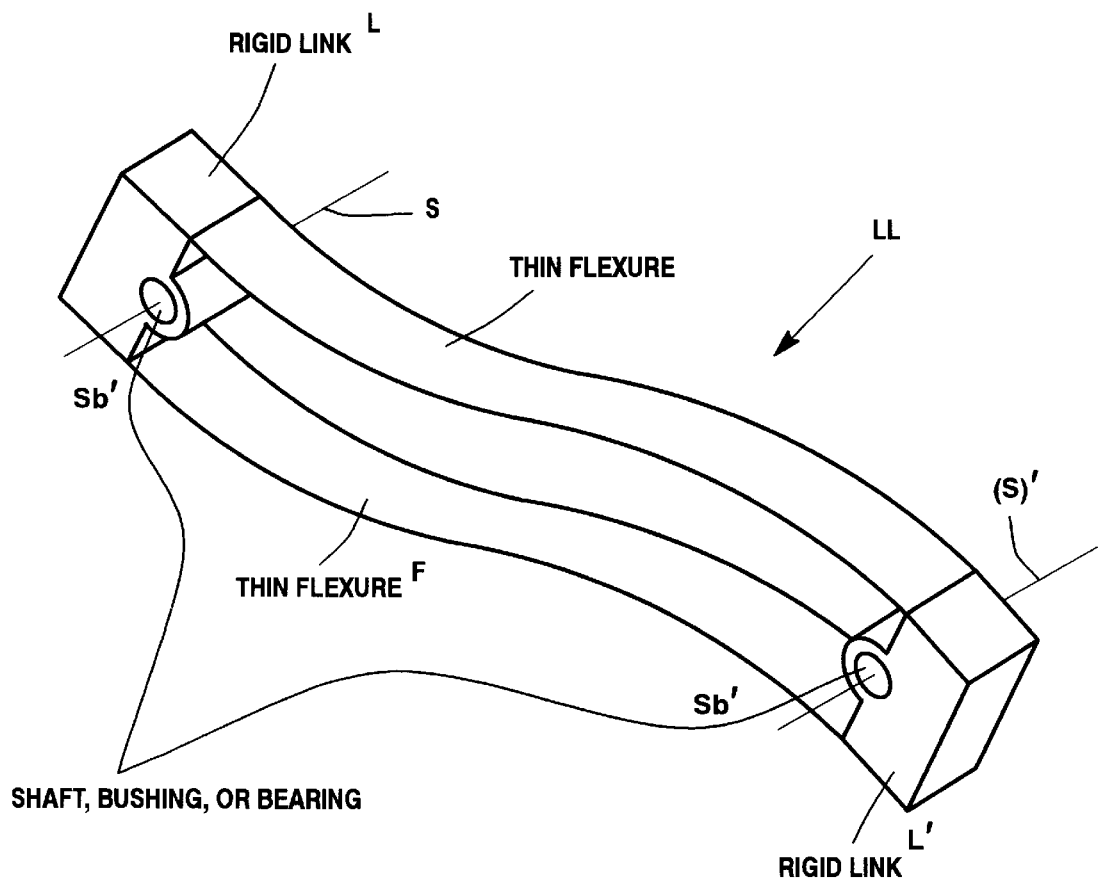

FIG. 1 shows an isometric simplified view of a preferred invention, embodiment, a "paired flexure" linkage device LL shown in the rotated position. Here, a flexure will be understood as a thin strip having flexibility in bending. Linkage LL comprises two flexure strips F,F', with both ends of each fastened to a relatively rigid link or arm, L,L'. Each arm L,L' is allowed to rotate about the axis of a respective shaft or bearing sb,sb' affixed to a respective link. The length of each rigid link, between the flexure and the axis of rotation, is relatively unimportant, the result is a compact coupling device.

Each flexure strip F,F' may be fastened to links L,L' by any one of many well-known means, such as welding, bonding, gluing, screwing, riveting, etc. Each link includes a respective bearing (sb for L, sb' for L') which rotates on a fixed shaft S,S'—or it may be fixed to a shaft which rotates in bearings fixed to a frame. These and other means are well known to those who practice the art of transmitting motion between parallel shafts. It is not the object of this invention to describe the many construction variations possible. The means of transmitting rotational motion described in this invention will work with a wide variety of commonly known constructions.

FIG. 1 shows a pair of like flexure strips F,F' one on either side of the shafts S,S'. Two flexure strips are preferred (e.g. vs. one) because they will have greater load-carrying capacity and will have much less tendency to buckle.

Figure 2A:
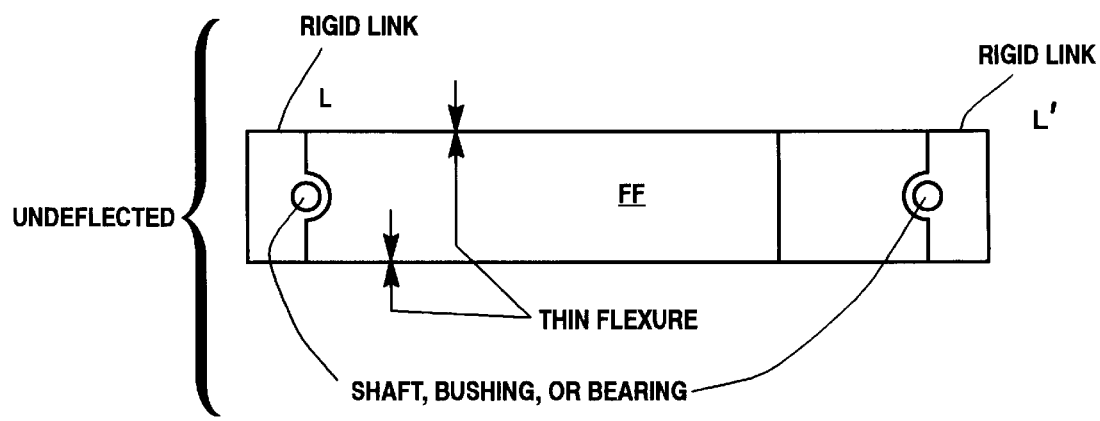
FIG. 2A shows such a flexure in "undeflected" condition.
Figure 2B:
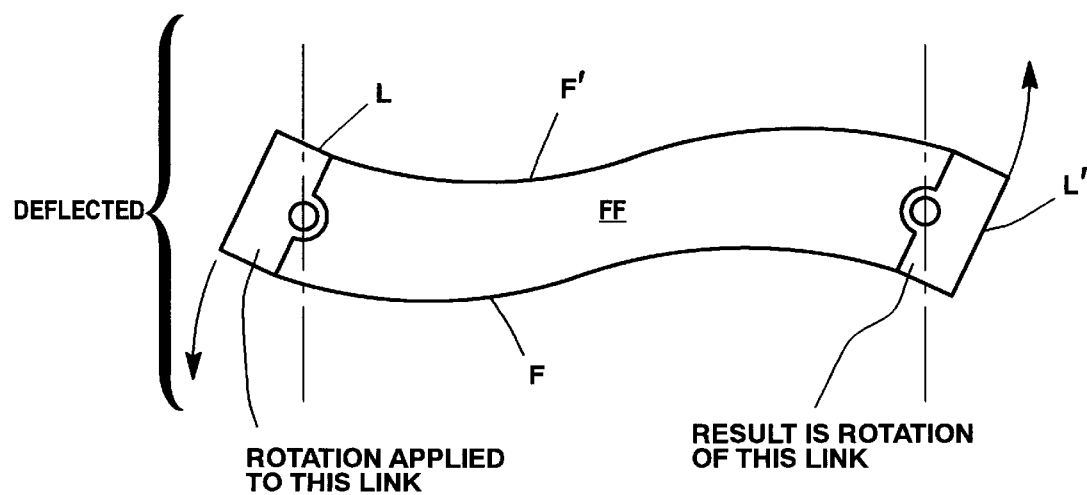
FIG. 2B shows it in "deflected" condition.

FIGS. 2 show "paired flexure" couplings in the undeflected (FIG. 2A) and deflected (FIG. 2B) condition. Thus, in FIG. 2B, when the left hand link L is rotated counterclockwise (arrow). The "paired flexures" (FF) made up of F,F' will bend as indicated. This bending of the flexure strips will cause the right hand link L' to rotate. The rotation of the right hand link L' will also be in the counterclockwise direction (see arrow). As the top of the left hand link L moves towards the right, it pushes the right hand link L' also to the right through the top flexure (F' FIG. 1). If there were heavy loads on the right hand link, this pushing of the top flexure might cause it to buckle. The bottom of the left hand link L moves to the left during this counterclockwise rotation, and this pulls the bottom of the right hand link L' to the left via flexure F. This also aids in the rotation of the right hand link. Since the bottom flexure F is being pulled, it will not buckle if there are heavy loads on the right hand link L'. The bottom flexure F will support the heavy loads and prevent the top flexure F' from buckling.

This invention will also work if the left hand link L is given a clockwise rotation. Also, it does not matter whether the rotation is applied to the left hand link L or to the right hand link L'.

Figure 3:
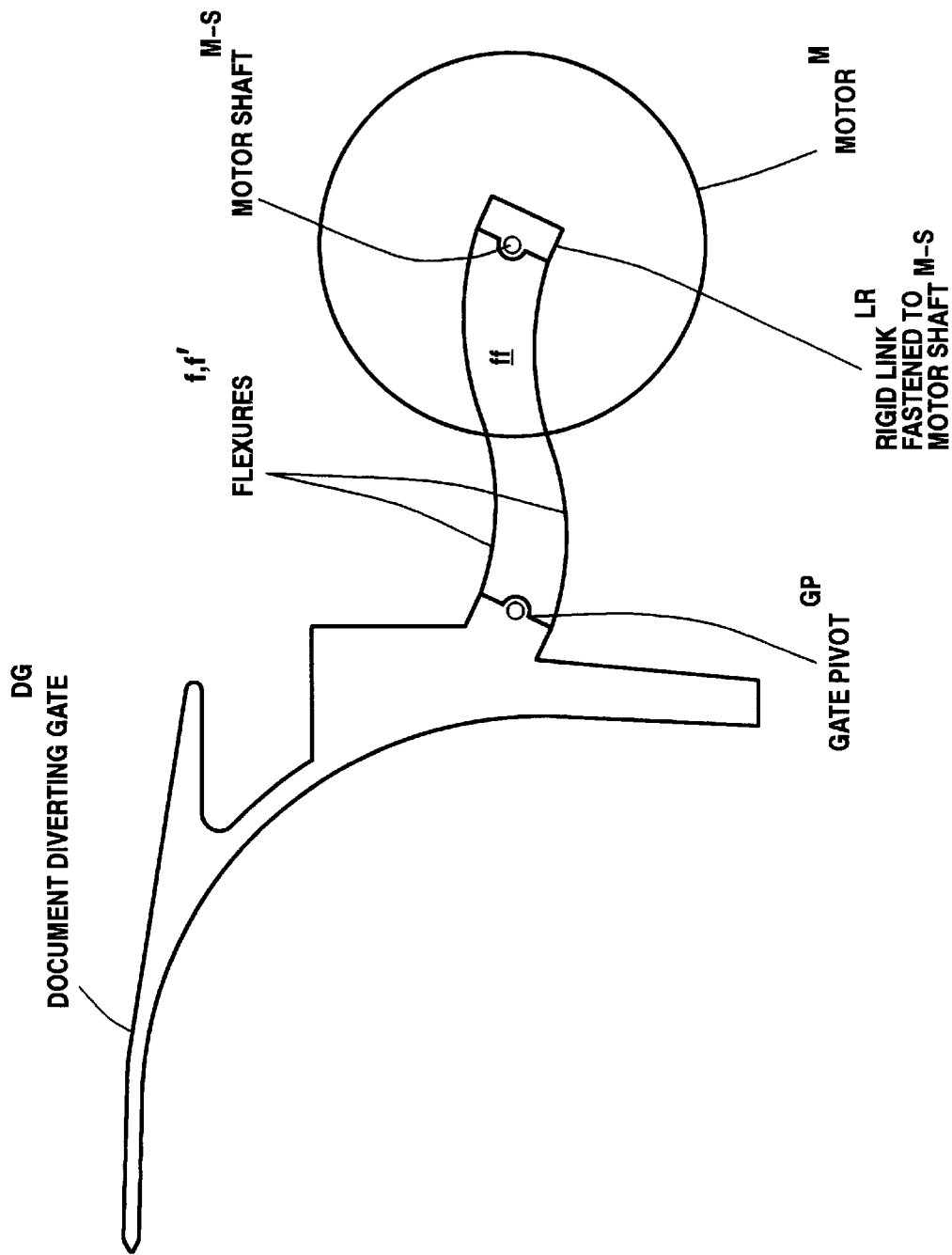
FIG. 3 shows a like paired set of flexure strips linking a driving motor shaft to a driven sort-gate structure.

Use for Gate Movement (FIG. 3)

FIG. 3 shows a modified embodiment of a "paired flexure" array ff, wherein a pair of flexures f,f (like F,F' in FIGS. 1, 2A, 2B) are used to couple a document-diverting gate DG rotatibly mounted on pivot G-p, to a driving motor M and associated motor shaft M-S. Shaft M-S is controllably rotated by motor M (as known in the art), and thus rotates attached rigid link LR and paired-flexure strips f,f attached thereto, to rotate gate DG about its pivot G-p, as known in the art (e.g. to selectively divert documents passing along a transport track, e.g. into a sort pocket, as known in the art). Here, gate DG will be recognized as forming the "other" rigid link fastened to the ends of flexure strips f,f opposite link LR.

Results

A finite element analysis was performed using exemplary dimensions of components, with prescribed input motion (rotation x°) given to rigid motor link LR. The analysis showed that the other link (gate DG) rotated nearly the same amount. Finite element analysis is a well known method for computing structural deformations.

Related Uses

Such "paired-flexure" linkage for transmitting minor rotation may similarly be used in other applications as contemplated by workers, e.g. for document sorters, mail sorters, copiers, envelope stuffing machines, money feeders in automatic teller machines, sewing machines, food processing equipment, packaging machines, agricultural machinery, excavating & mining machinery, still cameras; and the like.

What is claimed is:

1. A linkage coupling first and second rotatable shafts which allows the rotation of one said shafts to cause rotation of the other said shaft, said linkage comprising:
   a first link secured to said first shaft so as to rotate said first shaft when said first link is rotated;
   a second link secured to said second shaft so as to rotate said second shaft when said second link is rotated, said first and second shafts rotating around parallel axes; and,
   a pair of thin flexure strips disposed in parallel between said first and second links so that the rotation of one of said links will cause said flexure strips to rotate the other of said links thus causing rotation of said shafts around parallel axes, said flexure strips flexing and bending together as said links rotate, the rotational motion transmitted by said flexure strips having the same axis as the rotation axis of said shafts.

2. The invention of claim 1, wherein each said flexure strip is comprised of a thin strip of flexible metal.

3. The invention of claim 1, wherein said flexure strips are disposed adjacent one another and separated from one another so as to flex and bend coordinately without buckling.

4. The invention of claim 1, wherein the rotation of said rotatable shafts is less than 90 degrees.

5. A linkage coupling a pair of rotatable shafts which allows the rotation of one said shaft to cause rotation of the other said shaft, said linkage comprising:
   a pair of thin flexure strips disposed in parallel between said pair of parallel rotatable shafts, one end of said pair of flexure strips coupled to one of said rotatable shafts and the other end of said pair of flexure strips coupled to said other rotatable shaft;
   said pair of thin flexure strips coupled to said shafts so that the rotation of one of said shafts will cause said flexure strips to rotate said other of said shafts; and,
   said rotatable shafts rotating around parallel axes, said flexure strips flexing and bending together as said rotatable shafts rotate, the rotational motion transmitted by said flexure strips having the same axis as the rotation axis of said shafts.

6. The invention of claim 5, wherein each said shaft is rotatably coupled to rigid linkage means, to which a respective end of said flexure strips are coupled.

7. The invention of claim 5, wherein each said flexure strip is comprised of a thin strip of flexible steel.

8. The invention of claim 5, wherein said flexure strips are disposed adjacent one another and separated from one another so as to flex and bend coordinately without buckling.

9. The invention of claim 5, wherein the rotation of said rotatable shafts is less than 90 degrees.

10. A linkage array wherein first shaft means is mounted rotatably in first linkage means, second shaft means is mounted rotatably in second linkage means, and paired-flexure coupling means is disposed between said linkage means to accommodate minor coordinate corotation of both said shaft means, up to about 90°, yet without backlash, or sliding surfaces or attendant noise or dust.

11. The invention of claim 10, wherein said coupling comprises a pair of like thin flexure strips attached between said linkage means and disposed in parallel co-flexing relation to flex and bend together, with one end of said strips attached to said first linkage means and the other end of said strips attached to said second linkage means.

12. The invention of claim 11, wherein each said shaft means is rotatably coupled to a respective said linkage means, with said flexure strips so arranged to impart the rotation of one said shaft means to the other said shaft means.

13. The invention of claim 12, wherein each said shaft means is rotatably coupled to respective rigid linkage means, and wherein one end of said flexure strips is attached to each said linkage means.

14. The invention of claim 10, wherein said flexure coupling is comprised of a pair of like thin strips of flexure-metal.

15. The invention of claim 14, wherein each said strip is comprised of a thin strip of flexure-steel.

16. The invention of claim 14, wherein each said shaft means is rotatably coupled to a respective rigid linkage means; and wherein a respective end of said flexure strips is coupled to each said linkage means.

17. The invention of claim 10, wherein said coupling comprises a pair of like thin flexure strips disposed adjacent one another so as to flex and bend coordinately without buckling, and so transmit the minor rotation of one said shaft means to the other said shaft means.

* * * * *